United States Patent
Hirai et al.

(10) Patent No.: US 8,564,725 B2
(45) Date of Patent: Oct. 22, 2013

(54) VIDEO DATA PROCESSING APPARATUS AND CONTRAST CORRECTING METHOD

(75) Inventors: Jun Hirai, Tokyo (JP); Makoto Tsukamoto, Kanagawa (JP); Masaya Igarashi, Chiba (JP)

(73) Assignee: Sony Corporation (JP)

( * ) Notice: Subject to any disclaimer, the term of this patent is extended or adjusted under 35 U.S.C. 154(b) by 130 days.

(21) Appl. No.: 13/204,875

(22) Filed: Aug. 8, 2011

(65) Prior Publication Data

US 2012/0044423 A1 Feb. 23, 2012

(30) Foreign Application Priority Data

Aug. 18, 2010 (JP) ................ P2010-182764

(51) Int. Cl.
| | |
|---|---|
| H04N 5/14 | (2006.01) |
| H04N 7/12 | (2006.01) |
| H04N 9/083 | (2006.01) |
| H04N 3/14 | (2006.01) |
| H04N 5/335 | (2011.01) |
| G06K 9/00 | (2006.01) |

(52) U.S. Cl.
USPC ......... 348/671; 348/384.1; 348/274; 382/168

(58) Field of Classification Search
None
See application file for complete search history.

(56) References Cited

U.S. PATENT DOCUMENTS

| 7,003,153 | B1* | 2/2006 | Kerofsky | 382/168 |
| 2005/0083434 | A1* | 4/2005 | Hatano | 348/384.1 |
| 2007/0201858 | A1* | 8/2007 | Shiohara | 396/310 |
| 2009/0051794 | A1* | 2/2009 | Ando | 348/274 |

FOREIGN PATENT DOCUMENTS

JP 3549356 B2 8/2004

* cited by examiner

*Primary Examiner* — Jefferey Harold
*Assistant Examiner* — Sean Haiem
(74) *Attorney, Agent, or Firm* — Lerner, David, Littenberg, Krumholz & Mentlik, LLP (57) ABSTRACT

A video data processing apparatus includes: a contrast correction calculating section correcting the contrast of input luminance data by performing a calculation using a contrast correction value; an error diffusion section performing an error diffusion process on the luminance data whose contrast has been corrected; an error diffusion setting section setting whether to perform the error diffusion process at the error diffusion section; a correction value setting section detecting black and white peak values of an input luminance signal and setting the contrast correction value using the detected black and white peak values; and a correction amount adjusting section adjusting the contrast correction value set by the correction value setting section depending on whether the error diffusion process is performed at the error diffusion section according to an instruction from the error diffusion setting section and supplying the adjusted contrast correction value to the contrast correction calculating section.

8 Claims, 8 Drawing Sheets

Wp: WHITE PEAK
mWp: MODERATED WHITE PEAK
Bp: BLACK PEAK
mBp: MODERATED BLACK PEAK

FIG.5

ADJUSTING COEFFICIENTS N, M DEPENDING ON USER SETUP/ERROR DIFFUSION

| USER SET COEFFICIENT U | BIAS ADJUSTING COEFFICIENT N | | GAIN ADJUSTING COEFFICIENT M | |
|---|---|---|---|---|
| | ERROR DIFFUSION ON (S=2) | ERROR DIFFUSION OFF (S=1) | ERROR DIFFUSION ON (S=2) | ERROR DIFFUSION OFF (S=1) |
| 0 | 0 | 0 | 0 | 0 |
| 1 | 2 | 1 | 2 | 1 |
| 2 | 4 | 2 | 4 | 2 |
| 3 | 6 | 3 | 6 | 3 |

FIG.6

ADJUSTING COEFFICIENT TABLE

| USER SET COEFFICIENT | BIAS ADJUSTING COEFFICIENT N | | GAIN ADJUSTING COEFFICIENT M | |
|---|---|---|---|---|
| U | ERROR DIFFUSION ON (S=2) | ERROR DIFFUSION OFF (S=1) | ERROR DIFFUSION ON (S=2) | ERROR DIFFUSION OFF (S=1) |
| 0 | 0 | 0 | 0 | 0 |
| 1 | 2 | 0 | 2 | 1 |
| 2 | 4 | 2 | 4 | 2 |
| 3 | 6 | 3 | 6 | 3 |

FIG.7A

BLACK ADJUSTMENT CURVE OF THE EMBODIMENT

FIG.7B

BLACK ADJUSTMENT CURVE OBTAINED WITHOUT CONTRAST ADJUSTMENT

FIG.8A

FIG.8B

VIDEO DATA PROCESSING APPARATUS AND CONTRAST CORRECTING METHOD

CROSS-REFERENCE TO RELATED APPLICATION

The present application claims priority from Japanese Patent Application No. JP 2010-182764 filed in the Japanese Patent Office on Aug. 18, 2010, the entire content of which is incorporated herein by reference.

FIELD

The present disclosure relates to a video data processing apparatus and a contrast correcting method.

BACKGROUND

Japan Patent No. 3549356 (Patent Document 1) discloses a technique for detecting a maximum value and a minimum value of a video luminance signal and multiplying the luminance signal by correction values obtained from the result of the detection to correct gray levels (contrast).

SUMMARY

Various improvements are desired for the correction of contrast of video signals.

Presently, a video signal is processed after converting it into a digital signal in general. In such a case, it is desirable to process the signal without causing the problem of quantization errors. An error diffusion process may be performed to prevent degradation of image quality attributable to quantization errors, and the process must be carried out in conformity to the correction of contrast.

Further, users' preference in contrast is diverse, and it is therefore not necessarily desirable to correct contrast of various images in the same way.

Under such circumstances, it is desirable to allow contrast correction to be carried out properly in various situations.

An embodiment of the present disclosure is directed to a video data processing apparatus including a contrast correction calculating section correcting the contrast of input luminance data by performing a calculation using a contrast correction value, an error diffusion section performing an error diffusion process on the luminance data whose contrast has been corrected, an error diffusion setting section setting whether to perform the error diffusion process at the error diffusion section or not, a correction value setting section detecting a black peak value and a white peak value of an input luminance signal and setting the contrast correction value using the detected black peak value and white peak value, and a correction amount adjusting section adjusting the contrast correction value set by the correction value setting section depending on whether the error diffusion process is performed at the error diffusion section or not according to an instruction from the error diffusion setting section and supplying the adjusted contrast correction value to the contrast correction calculating section.

When the error diffusion process at the error diffusion section is not performed according to a setting made by the error diffusion setting section, the correction amount adjusting section may adjust the contrast correction value so as to suppress the contrast correction amount obtained by the contrast correction calculating section below the amount of a correction made when the error diffusion process is performed.

The video data processing apparatus may include a user setting section for setting a contrast correction amount according to selection made by a user. The correction amount adjusting section may adjust the contrast correction value depending on whether the error diffusion process at the error diffusion section is performed or not and, in addition, according to the contrast correction amount set at the user setting section.

The correction value setting section may set the contrast correction value using a difference between a detected black peak value and a detected white peak value and a difference between a moderated black peak value and a moderated white peak value associated with the detected black peak value and white peak value, among moderated black peak values and moderated white peak values which are set in association with respective gray level values.

The correction value setting section may smooth the detected black peak value and the detected white peak value at a smoothing time constant which is a period of 60 fields or more and may set the contrast correction value using the smoothed black peak value and white peak value.

The video data processing apparatus may include a scene change detecting section detecting a scene change in video data. The correction value setting section may temporarily change the smoothing time constant into a shorter time constant when a scene change is detected by the scene change detecting section.

The correction value setting section may detect a black peak value and a white peak value of a luminance signal from a peak detection area which is a pixel region forming a part of a video screen. The apparatus may further include a gray level compensating section converting input and output values of the luminance data corrected by the contrast correcting section such that gray levels will be maintained.

Another embodiment of the present disclosure is directed to a contrast correcting method including: allowing a setting to be made as to whether to perform an error diffusion process at an error diffusion section or not and adjusting a contrast correction value set by a correction value setting section depending on whether the error diffusion process is performed at the error diffusion section or not and performing contrast correction at a contrast correction calculating section using the adjusted contrast correction value.

According to the embodiment of the present disclosure, a contrast correction amount is adjusted depending on whether an error diffusion process is performed or not.

Error diffusion is a process of obtaining an image which seems smooth in terms of gray level transitions using dot densities to represent values falling between gray levels which have been difficult to represent due to limitations placed by quantization steps when converting, for example, n-bit digital data into m-bit data (n>m). Known error diffusion processes include noise shaping, e.g., super bit mapping (a registered trademark of Sony Corporation) for converting quantization error components into high frequency components which are difficult to perceive for human eyes and dithering utilizing random noises.

When the contrast of video content is corrected, so-called banding or visually perceivable boundaries between gray levels may occur depending on the type of the content.

Banding on video content can be made unnoticeable by performing error diffusion on the video data after correcting the contrast thereof.

On the contrary, it is sometimes desirable to stop error diffusion. In such a case, banding attributable to contrast correction becomes noticeable.

According to the embodiment of the present disclosure, a contrast correction amount is adjusted depending on whether an error diffusion process is performed or not, which makes it possible to obtain an image having properly corrected contrast regardless of whether an error diffusion process is performed or not.

According to the embodiment of the present disclosure, video data having properly corrected contrast can be obtained regardless of whether an error diffusion process is performed or not.

DETAILED DESCRIPTION

A video data processing apparatus according to an embodiment of the present disclosure will now be described according to the following order of items.

<1. Configuration of Video Data Processing Apparatus>
<2. Setting of Correction Values>
<3. Error Diffusion and Correction Amount Adjustment According to User Setting>
<4. Contrast Stabilization>
<5. Cancellation of Differences between Display Systems>
<6. Gray Level Compensation to Cope with Over-Compensation>

<1. Configuration of Video Data Processing Apparatus>

Figure 1:
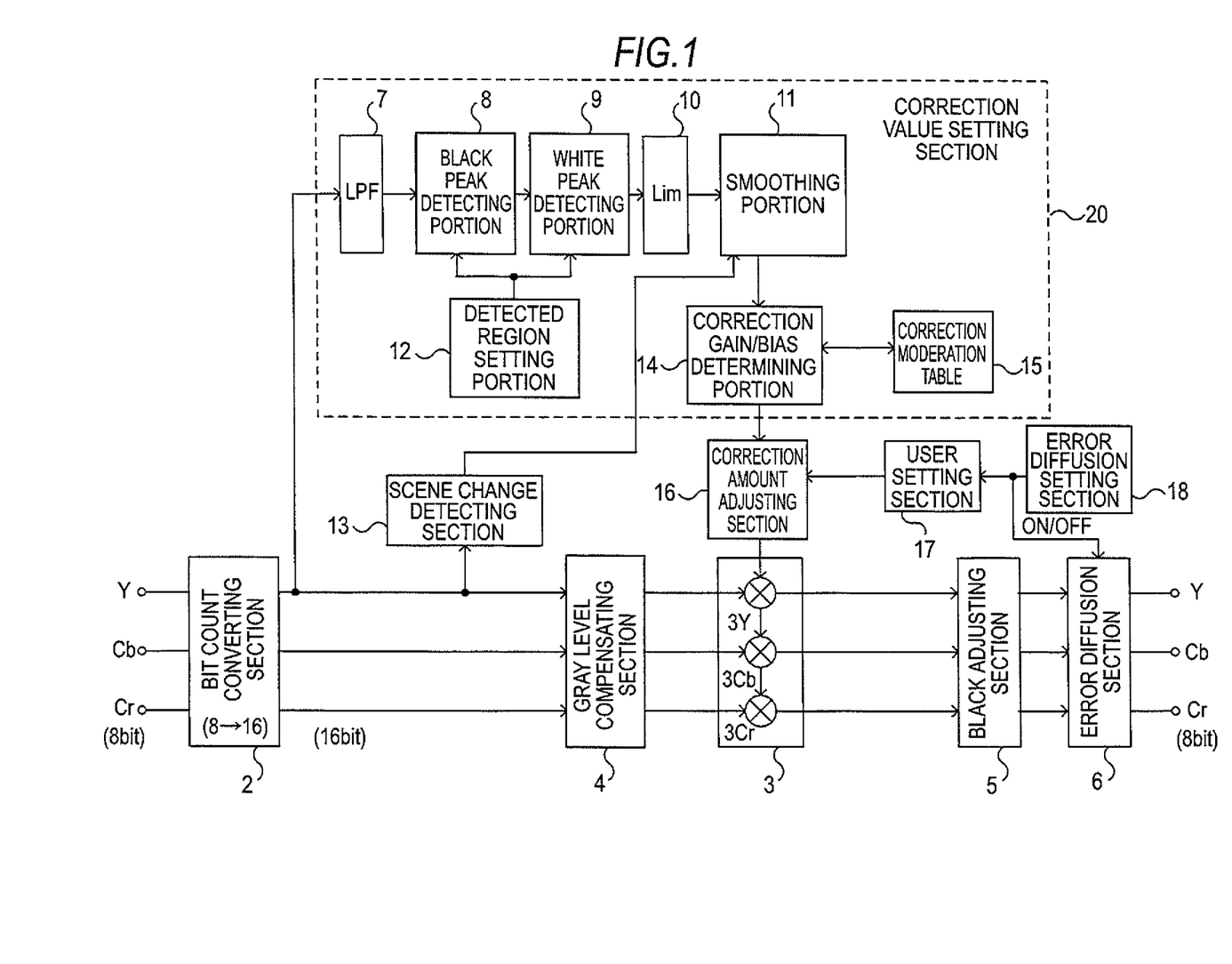
FIG. 1 is a block diagram of a video data processing apparatus according to an embodiment of the present disclosure.

FIG. 1 is a block diagram of a video data processing apparatus 1 according to an embodiment of the present disclosure.

The video data processing apparatus 1 is an apparatus to which luminance data Y and Chrominance data Cb and Cr are input as video data and which performs contrast correction of the video data. Most video data are normally transmitted in the form of 8-bit data. The video data processing apparatus 1 of the present embodiment processes 8-bit video data supplied thereto after converting it into data having 10 or more bits. The processed data is re-converted into 8-bit data which is then supplied to a display monitor or the like provided downstream the apparatus.

The video data processing apparatus 1 is provided with a bit count converting section 2, a gray level compensating section 4, a contrast correction calculating section 3, a black adjusting section 5, and an error diffusion section 6, which collectively serve as a system for processing video data (Y, Cb, and Cr) input to the apparatus.

The bit count converting section 2 converts 8-bit video data (Y, Cb, and Cr) input thereto into data having 10 or more bits. For example, input data are converted into 16-bit data. For example, eight bits "00000000" are added to original data to convert it into 16-bit data. A smoothing process may be performed in advance to achieve smoothness equivalent to 16-bit resolution. Then, higher gray level characteristics can be achieved. Video data may alternatively be converted into data of other bit counts such as 12 bits and 14 bits.

The 16-bit luminance data Y and chrominance data Cb and Cr are processed by the gray level compensating section 4. In this case, input values are converted into output values such that neither black clipping nor white clipping will occur even if contrast correction results in over-compensation.

The resultant luminance data Y and chrominance data Cb and Cr are supplied to the contrast correction calculating section 3.

The contrast correction calculating section 3 includes calculation circuits 3Y, 3Cb, and 3Cr associated with the luminance data Y, chrominance data Cb, and chrominance data Cr, respectively.

The calculation circuits 3Y, 3Cb, and 3Cr carry out a predetermined calculation on the luminance data Y, chrominance data Cb, and chrominance data Cr, respectively, using a contrast correction value supplied from the correction amount adjusting section 16 to obtain corrected luminance data Y and chrominance data Cb and Cr having values reflecting contrast correction.

The luminance data Y and the chrominance data Cb and Cr having contrast corrected by the contrast correction calculating section 3 are supplied to the black adjusting section 5.

The black adjusting section 5 adjusts black regions according to a γ curve reflecting differences between display systems involved and preferences of the user.

The error diffusion section 6 re-converts the 16-bit luminance data Y and chrominance data Cb and Cr into 8-bit data and performs error diffusion to suppress deterioration of image quality caused by quantization errors attributable to the conversion. Error diffusion is a process of obtaining an image having smooth gray level transitions by using dot densities to represent values falling between gray levels which have been difficult to represent due to limitations placed by quantization steps.

Figure 2A:
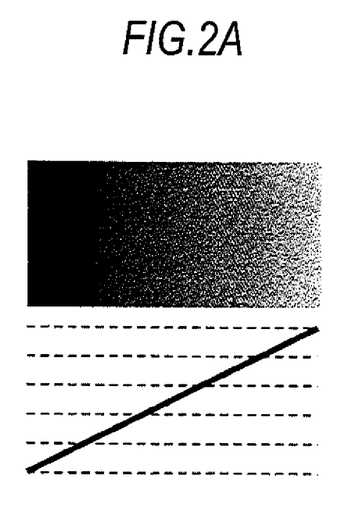
FIGS. 2A, 2B, and 2C are illustrations for explaining an error diffusion process.

Operations of the embodiment will be briefly described with reference to FIGS. 2A, 2B, and 2C. Let us assume that FIG. 2A shows an image represented by data having 10 or more bits. Let us discuss conversion of such data into 8-bit data.

The broken lines in the lower part of FIG. 2A represent 8-bit resolution, and the solid line in the figure represents resolution provided by 10 or more bits.

Figure 2B:
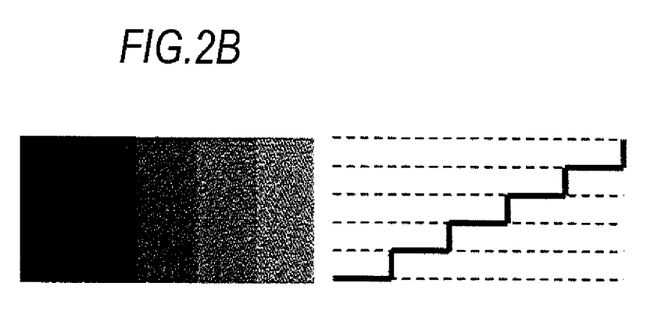

When data is converted into 8-bit data without performing error diffusion on the same, the resultant image has gray levels which are discontinuous as shown in FIG. 2B, and the image therefore has banding as illustrated.

Figure 2C:
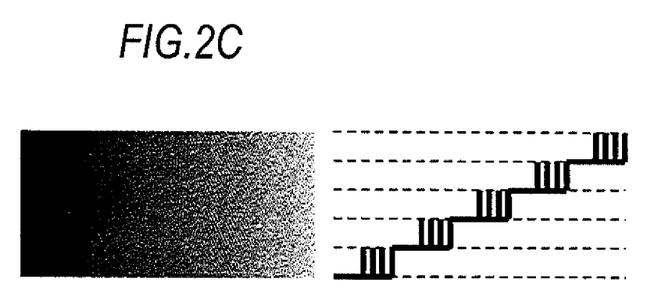

On the contrary, when error diffusion is carried out, the data is converted as shown in FIG. 2C. Specifically, the data is converted in 8-bit resolution, and values falling between the resultant gray levels are represented using dot densities. Thus, an image having no noticeable banding can be obtained as shown.

According to the above description, the error diffusion section 6 shown in FIG. 1 operates as described below.

When the contrast correction calculating section 3 performs a coefficient calculating process to obtain 16-bit video data from 8 bit-data, the process results in a value having a decimal part unlike the value represented by the original 8-bit data. For example, when a certain piece of luminance data Y has a value "20", the value may be converted into "20.3" or "20.8" as a result of a contrast correcting calculation. When the data is converted into 8-bit data, the value "20.3" is changed to "20", and the value "20.8" is changed to "21". Noticeable banding occurs at the boundary between the gray levels, and the quality of the resultant image may be degraded by the banding.

While such a phenomenon rarely occurs in an image which inherently has a great amount of noise components, e.g., a photographic image, a noiseless image such as animation created using a computer is liable to such a phenomenon. Further, the contrast correcting gain varies according to the pattern of the image to which the gain is applied, and the pattern of banding changes accordingly. Thus, the resultant image will be displayed in an unfavorable manner. When smoothing is carried out with a greater time constant, the pattern of an image will change more slowly, and the image will therefore appear in a more unfavorable manner.

In such a situation, error diffusion may be carried out to represent gray levels in resolution of 8 bit or more, and banding can therefore be made less noticeable.

The error diffusion section 6 performs error diffusion as described above to output 8-bit luminance data Y and chrominance data Cb and Cr downstream thereof.

The video data processing apparatus 1 shown in FIG. 1 includes a correction value setting section 20 provided to obtain a contrast correction value to be supplied to the contrast correction calculating section 3.

The correction value setting section 20 includes a low pass filter (LPF) 7, a black peak detecting portion 8, a white peak detecting portion 9, a limiter 10, a smoothing portion 11, a detection area setting portion 12, a correction gain/bias determining portion 14, and a correction moderation table 15.

The apparatus also includes a scene change detecting section 13, a correction amount adjusting section 16, a user setting section 17, and an error diffusion setting section 18.

Luminance data Y supplied from the bit count converting section 2 is supplied to the LPF 7 of the correction value setting portion 20. The LPF 7 performs high-cut filtering to reduce noise.

The black peak detecting portion 8 detects a minimum value of the luminance data Y within a pixel range (peak detection area) set by the detection area setting portion 12.

The white peak detecting portion 9 detects a maximum value of the luminance data Y within the pixel range set by the detection area setting portion 12.

The detection area setting portion 12 sets a central region A of one frame screen of an image (e.g., a pixel region indicated by hatching in FIG. 8B) as a peak detection area. The black peak detecting portion 8 and the white peak detecting portion 9 detect peaks of black and white, respectively, from luminance data Y representing the values of pixels within the peak detection area.

The reason for detecting peaks in the central region A of the screen is that the central region A is a point where a user focuses when viewing an image and that contrast adjustment is therefore likely to be satisfactory for the user when contrast is corrected based on the luminance of the region.

The limiter 10 places limitations on the values of the black and white peaks detected as thus described. Depending on the content of the image of interest, the black peak thus detected may have a considerably high luminance value, and the white peak may have a considerably low luminance value. In such a case, contrast cannot be properly corrected by setting a coefficient to serve as a contrast correction value based on the difference between the white and black peaks.

An upper limit value for black peaks and a lower limit for white peaks are set, and the limiter 10 limits black peaks to the upper limit and white peaks to the lower limits when the black and white peaks will otherwise exceed to upper and lower limits.

The smoothing section 11 smoothes values of detected black and white peaks using a somewhat long time constant. A time constant of 60 fields or more is set in the present embodiment.

The values of black and white peaks smoothed as thus described are supplied to the correction gain/bias determining portion 14.

The scene change detecting section 13 receives the input of luminance data Y and detects a scene change from a change in an average value of luminance levels throughout the frame. That is, the section detects timing at which video content changes from one scene to another.

The smoothing section 11 temporarily shortens the smoothing time constant when a scene change detection signal is supplied from the scene change detecting section 13.

The correction gain/bias determining portion 14 determines a correction gain and a bias value to be supplied to the contrast correction calculating section 3 as contrast correction values.

The correction moderation table 15 is a table for obtaining moderated black peaks and moderated white peaks to be used for limiting corrections made to the luminance of intermediate gray levels between a black region and a white region. Details of the table will be described later.

In the present embodiment, the contrast correction values (a correction gain and a bias value) determined by the correction gain/bias determining portion 14 are supplied to the contrast correction calculating section 3 through the correction amount adjusting section 16.

The correction amount adjusting section 16 provides coefficients to the determined contrast correction values (the correction gain and the bias value), and in some cases, adjusts the values so as to reduce the correction amount.

Specifically, the correction amount adjusting section 16 adjusts the contrast correction values according to the setting by the error diffusion setting section 18 and the setting by the user setting section 17.

The error diffusion setting section 18 sets whether to execute error diffusion at the error diffusion section 6 or not. For example, whether to execute error diffusion or not is set according to selection made by a user, and the error diffusion section 6 is instructed to or not to execute error diffusion.

The user setting section 17 sets contrast correction amounts according to selection made by a user based on preference of the user. For example, a user can select four degrees of contrast correction.

Specifically, a user can select any of four degrees of correction 0, 1, 2, and 3 as a user setting, and the user setting section 17 outputs the value selected by the user to the correction amount adjusting section 16 as a user set coefficient U. That is, any of the values 0, 1, 2, and 3 is output as the user set coefficient U.

As will be described later, when the user set coefficient U is set at 3, the highest level of contrast correcting effect can be achieved by the setting. When the user set coefficient U is set at 2, a slightly lower correcting effect is achieved. When the user set coefficient U is set at 1, a still lower correcting effect is achieved by the setting. When the user set coefficient U is set at 0, no contrast correcting effect is achieved by the setting.

Obviously, the provision of four stepwise options available for user setting has been described by way of example only.

The correction amount adjusting section 16 adjusts a correction gain and a bias value according to the user set coefficient U set by the user setting section 17 and information on the setting whether to execute error diffusion at the error diffusion section 18 or not, and the adjusted values are supplied to the contrast correction calculating section 3.

The video data processing apparatus 1 having such a configuration can correct contrast in a manner that is preferable from the following points of view.

The correction of contrast is to be carried out such that the content of interest will not be rendered in a manner departing from the intention of the creator of the content, while improving the content of the content as a whole.

Banding attributable to quantization errors is to be prevented.

Gray levels must remain even if the correction of contrast results in over-compensation.

Stable contrast is to be achieved.

The correction of contrast is to be performed such that any difference between display systems will be canceled.

The correction of contrast is to be performed such that the user's preference will be reflected on the resultant image.

A description will now be made on operations of various parts of the apparatus shown in FIG. 1 which are performed to correct contrast in a preferable manner from the above-described points of view.

<2. Setting of Correction Values>

The contrast of content must be easily corrected in such a manner that the intention of the creator of the content will not be distorted while improving the contrast of the content as a whole. For this purpose, the correction value setting section 20 of the present embodiment determines contrast correction values as described below.

The intention of a content creator is not distorted in such a sense that the contrast of an image primarily formed by intermediate gray levels (e.g., gray levels in the 40 to 60 IRE range) is moderately corrected.

An image formed by intermediate gray levels is an image intended by the creator of the content to give a light and soft impression, and it is therefore desirable to keep changes in such an image as unstriking as possible.

For example, according to the technique disclosed in Patent Document 1, the correction of contrast has been carried out by combining operations such as limiting certain values, addition and subtraction, and multiplication and division. However, it has been difficult to making a setting for preventing intermediate gray levels from undergoing significant changes.

In the present embodiment, contrast correction values are determined based on detected black and white peaks using a lookup table for determining parameters such as a correction gain and a bias DC shift amount and gain to serve as the contrast correction values. Thus, it is possible to easily and reliably set a range of correction in which correction of content will not distort the intention of the creator of the content.

First, a normal contrast correcting operation will be described with reference to FIGS. 3A and 3B.

Figure 3A:
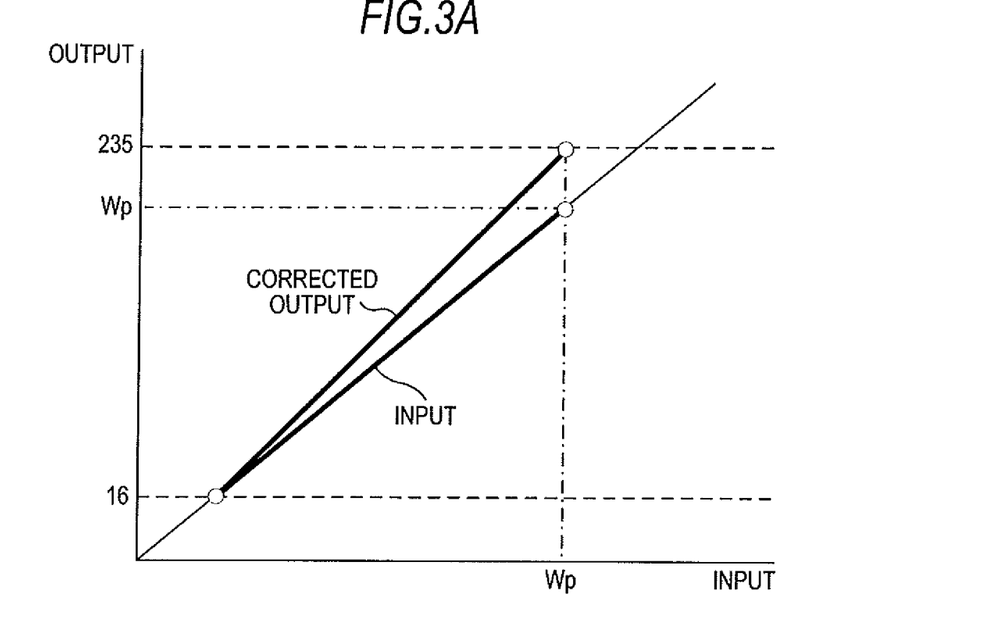
FIGS. 3A and 3B are graphs for explaining contrast correction.
Figure 3B:
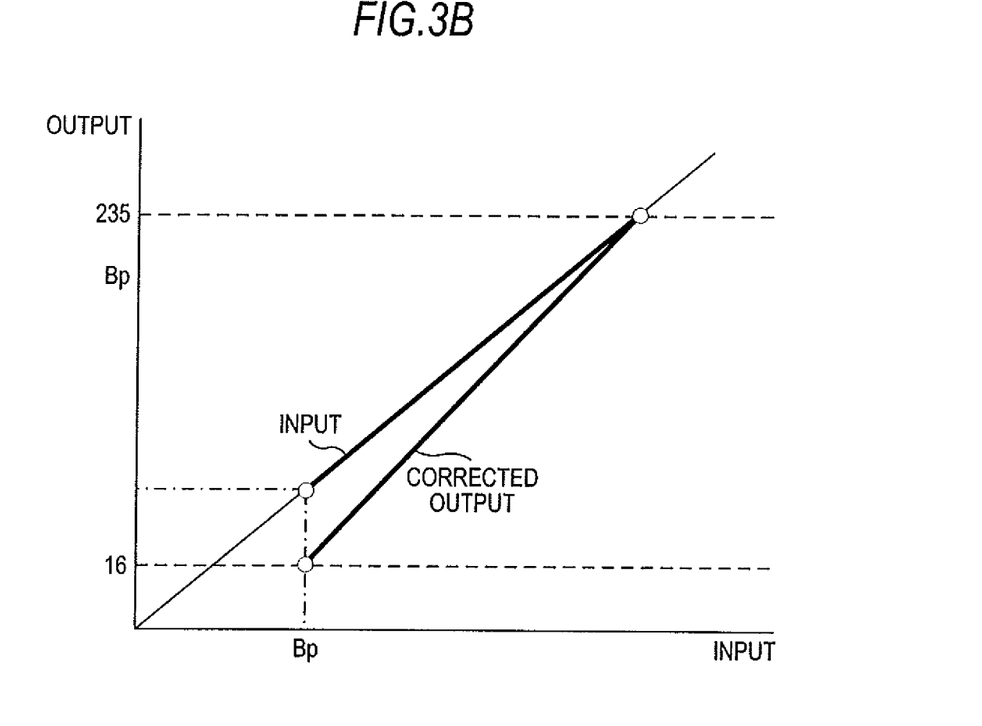

FIGS. 3A and 3B are plotted on an assumption that a signal or luminance data Y having 8 bits is input and output and that effective luminance levels of a video signal are in the range of 8-bit values from 16 to 235.

FIG. 3A shows a case wherein a white peak detected in input luminance data Y has a value "Wp" as illustrated.

In this case, contrast is corrected by setting such a coefficient that the white peak value Wp is pulled up to the maximum value "235" and multiplying each item of the luminance data Y in the frame by the coefficient to obtain a corrected output as illustrated.

Thus, a relatively dark shade of white is changed to appear as pure white in the resultant image, and the image therefore has improved contrast.

FIG. 3B shows a case wherein a black peak detected in input luminance data Y has a value "Bp" as illustrated.

In this case, contrast is corrected by setting such a coefficient that the black peak value Bp is pulled down to the minimum value "16" and multiplying each item of the luminance data Y in the frame by the coefficient to obtain a corrected output as illustrated.

Thus, a somewhat light shade of black is changed to appear as pure black in the resultant image, and the image therefore has improved contrast.

When an image including intermediate gray levels is similarly processed, the resultant image may be different from what is intended by the creator of the content.

Figure 4A:
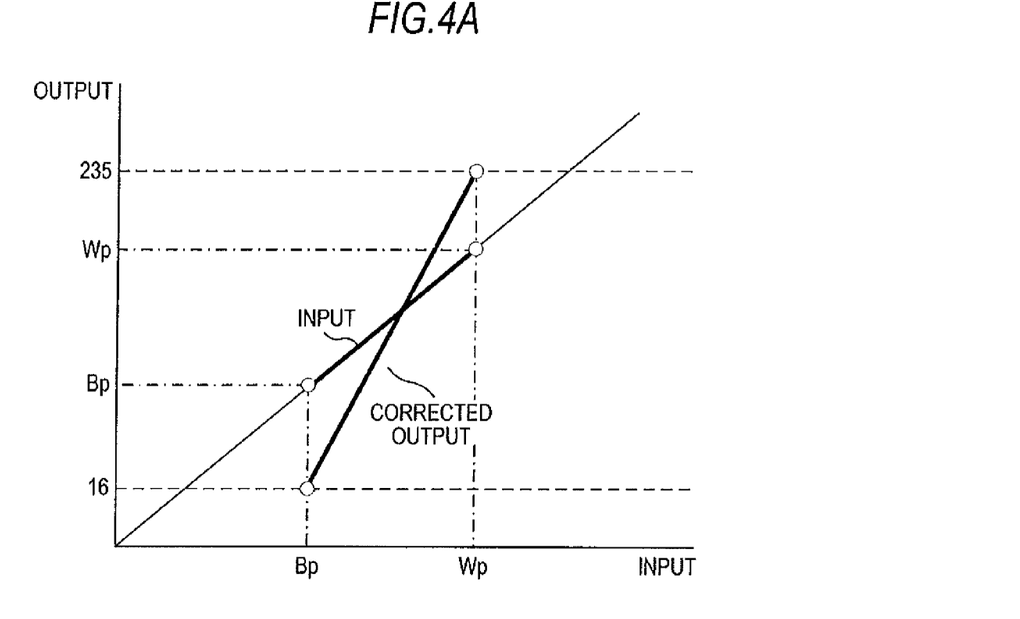
FIGS. 4A and 4B are graphs for explaining setting of contrast correction values utilizing moderated peaks according to the embodiment of the present disclosure.

FIG. 4A shows a case wherein a white peak detected in input luminance data Y has a value "Wp" and a black peak detected in the data has a value "Bp", as illustrated. The image is light and soft content including intermediate gray levels which give weak contrast.

In this case, contrast is corrected by setting such a coefficient that the white peak value Wp is pulled up to the maximum value "235" and the black peak value Bp is pulled down to the minimum value "16" and multiplying each item of the luminance data Y in the frame by the coefficient to obtain a corrected output as illustrated. However, the correction results in an unnatural image which has too strong contrast.

Under the circumstance, according to the present embodiment, contrast correction values (a correction gain and a bias value) are set using moderated peak values such that contrast correction will not be applied to signals of intermediate gray levels.

Such an operation will be described with reference to FIG. 4B.

Figure 4B:
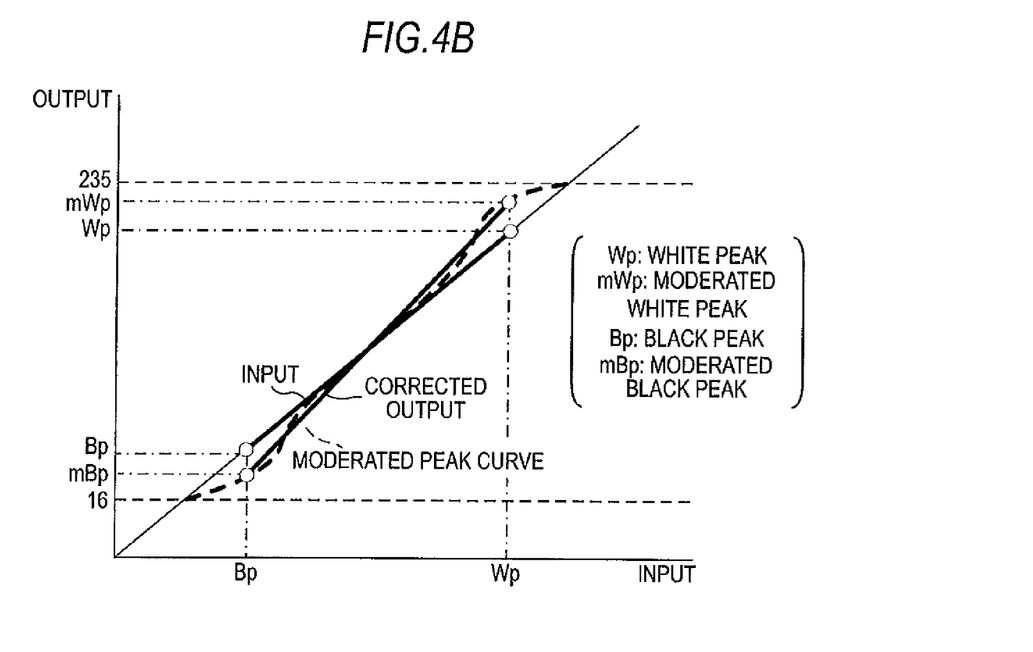

In FIG. 4B, a white peak detected in input luminance data Y has a value "Wp", and a black peak detected in the data has a value "Bp".

The thick broken line in the figure represents a moderated peak curve. The moderated peak curve represents a moderated minimum value and a moderated maximum value of each luminance level.

For example, when a black peak value of "16" is detected, the minimum value defined by the moderated peak curve is also "16". When a black peak having a value "Bp" is detected, a minimum value "mBp" is defined by the curve.

That is, minimum and maximum values are set in a variable manner depending on black peak values and white peak values detected.

For example, a moderated peak value is set as table data in associated with each of values from "16" to "235" as input values, and such values are held in the correction moderation table 15. Examples of such table data are indicated by broken lines in FIG. 4B.

In the case shown in FIG. 4B, contrast is corrected by setting such a coefficient (correction gain) that the white peak value Wp is pulled up to a moderated white peak mWp and the black peak value Bp is pulled down to a moderated black peak mBp and multiplying each item of the luminance data Y in the frame by the coefficient. Then, a corrected output is obtained as illustrated. As a result, the degree of contrast correction is moderated according to the video content of interest. In particular, contrast correction can be prevented from being applied to intermediate gray levels.

A description will now be made on a specific example of setting of contrast correction values carried out at the correction gain/bias determining portion 14 and an example of calculations carried out at the contrast correction calculating section 3.

The correction gain/bias determining portion 14 determines a correction gain and a bias value as contrast correction values based on the values of white and black peaks supplied from the smoothing portion 11.

A correction gain is obtained as follows.

Correction Gain=(moderated white peak−moderated black peak)/(white peak−black peak)  Expression 1

Specifically, a difference between a moderated black peak value and a moderated white peak value associated with a detected black peak value and a detected white peak value, respectively, is divided by a difference between the detected black and white peak values to obtain a correction gain.

The value of the moderated black peak is set as a bias value.

The correction gain, the bias value (which equals the value of the moderated black peak), and the value of the black peak are supplied to the contrast correction calculating section 3 through the correction amount adjusting section 16.

Let us now describe operations of the contrast correction calculating section 3 (calculation circuits 3Y, 3Cb, and 3Cr) with adjustment performed at the correction amount adjusting section 16 ignored. The section performs the following calculations using the correction gain and the bias value.

$Y_{out}=(Y_{in}-\text{black peak})\times \text{correction gain}+\text{bias value}$  Expression 2

$Cr\_out=(Cr\_in-128)\times \text{correction gain}+128$  Expression 3

$Cb\_out=(Cb\_in-128)\times \text{correction gain}+128$  Expression 4

Yin, Cr_in, and Cb_in represent luminance data Y, chrominance data Cr, and chrominance data Cr input to the contrast correction calculating section 3, respectively. Yout, Cr_out, and Cb_out represent luminance data Y, chrominance data Cr, and chrominance data Cr having corrected contrast output from the contrast correction calculating section 3, respectively.

As described above, the correction gain/bias determining section 14 of the present embodiment sets a correction gain that is a contrast correction value using a difference between detected black and white peak values and a difference between moderated black and white peak values associated with the detected black and white peak values among moderated black peak values and moderated white peak values which are set in association with respective gray level values. The value of the moderated black peak is set as a bias value.

In this case, it is possible to keep images formed by intermediate gray levels uncorrected (or almost uncorrected) in terms of contrast while correcting the contrast of other types of images properly using moderated black peak values and moderated white peak values which are set in association with respective gray level values on the correction moderation table 15.

Each of values represented by a moderated peak curve is a value to serve as a target toward which a peak value is to be pulled up (or pulled down) instead of the maximum value "235" or the minimum value "16". Therefore, the contrast of an image formed by intermediate gray levels can be kept uncorrected or only slightly corrected by making such a setting that black peaks of relatively high gray levels and white peaks of relatively low gray levels will not be pushed up (or pushed down) or pushed up (or pushed down) only in small amounts. That is, the contrast of an image can be easily corrected in adaptation to the image of interest only by setting table data on the correction moderation table 15 appropriately, for example, such that contrast correction will not be applied to an image having weak contrast.

<3. Error Diffusion and Adjustment of Correction Amount according to User Setting>

Contrast correction values are determined as described above in the present embodiment, and the degree of contrast correction is adjusted depending on whether error diffusion is carried out or not and depending on the choice of a user.

The correction amount adjusting section 16 adjusts a correction gain and a bias value determined by the correction gain/bias determining portion 14 as described above.

As described above, when the contrast of an image is corrected, noticeable banding may occur depending on the type of the image. Under the circumstance, the error diffusion section 6 performs error diffusion to eliminate banding, whereby a high quality image having corrected contrast can be output.

However, noise components can be superimposed on data as a result of error diffusion. In particular, when noise shaping such as super bit mapping is performed, noise can be superimposed on a high band. Adverse effects may be caused by noise components superimposed on a video signal as a result of error diffusion. Sounds from an apparatus receiving such a video signal such as an AV amplifier or a television may be accompanied by noise depending on the design of the receiving apparatus.

Since the type of such a receiving apparatus actually used depends on the purpose of the user, it is not known whether error diffusion will cause adverse effects when the apparatus of the embodiment is designed.

In the present embodiment, a setting can be made at the error diffusion setting section 18 as to whether to perform error diffusion or not depending on the purpose of a user. When a user wishes to avoid adverse effects exerted on sounds by noise components attributable to error diffusion, the user can disable error diffusion.

However, contrast correction can result in noticeable banding when error diffusion is not performed. A solution to this problem employed in the present embodiment is to keep contrast correction amounts small when error diffusion is disabled. Specifically, contrast correction amounts are kept small such that no visible banding will appear.

Further, the degree of the contrast correction effect to be achieved depends on the preference of each user. In the present embodiment, the user setting section 17 is provided to allow a user to select contrast correction amounts depending on his or her preference.

As will be apparent from above, the correction amount adjusting section 16 adjusts the degree of contrast correction depending on whether error diffusion is performed or not and according to selection made by a user.

Specifically, the adjustment is carried out as follows.

Referring to user setting carried out using the user setting section 17, any of four values 0, 1, 2, and 3 can be selected as the degree of contrast correction as described above. According to the selection from among the four values, any of the values 0 to 4 is supplied to the correction amount adjusting section 16 as the user set coefficient U from the user setting section 17.

Information on whether error diffusion is performed or not is also supplied to the correction amount adjusting section 16 from the error diffusion setting section 18. The correction amount adjusting section 16 sets a coefficient S according to the information on whether error diffusion is performed or not. For example, when error diffusion is performed, the coefficient S is set at 2. When error diffusion is not performed, the coefficient S is set at 1.

The correction amount adjusting section 16 obtains a correction gain adjusting coefficient M and a bias value adjusting coefficient N using the coefficient S and adjusts the correction gain and the bias value using the adjusting coefficients M and N.

The correction gain adjusting coefficient M is obtained as follows.

$$M = U \times 2 \times (S/2) \quad \text{Expression 5}$$

The bias value adjusting coefficient N is obtained as follows.

$$N = U \times 2 \times (S/2) \quad \text{Expression 6}$$

Figure 5:
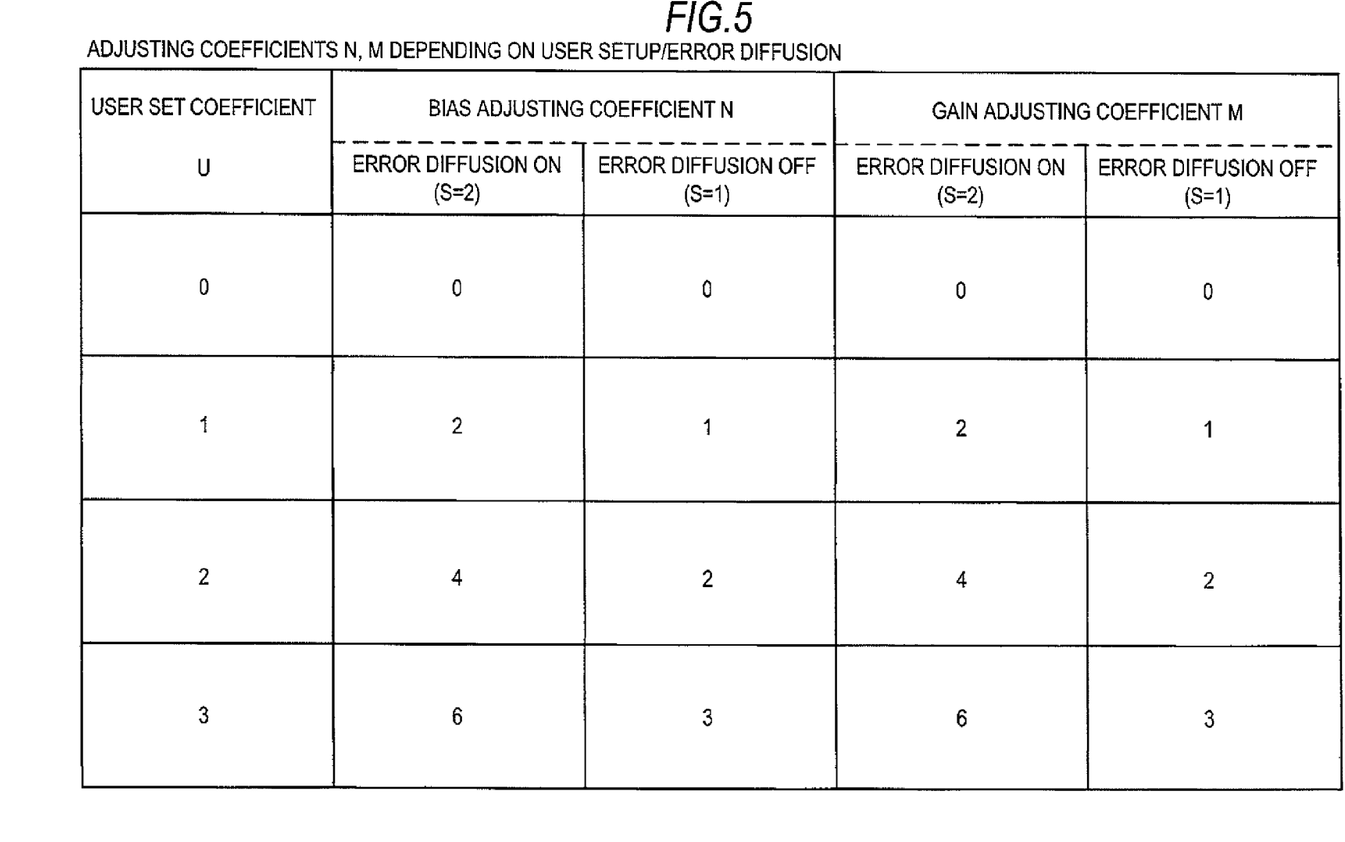
FIG. 5 is a table showing adjusting coefficients according to the embodiment of the present disclosure, the coefficients depending on whether error diffusion is performed or not and depending on settings made by a user.

Values of the bias adjusting coefficient N and the correction gain adjusting coefficient M obtained by the above expressions are shown in FIG. 5.

FIG. 5 shows values of the adjusting coefficients N and M obtained at each of user set values 0, 1, 2, and 3 in each of cases wherein error diffusion is performed and not performed.

For example, when the user set value is 0, the adjusting coefficients N and M are "0" whether error diffusion is performed or not.

At the user set value of 1, the adjusting coefficients N and M are "2" when error diffusion is performed, and the coefficients are "1" when error diffusion is not performed.

At the user set value of 2, the adjusting coefficients N and M are "4" when error diffusion is performed, and the coefficients are "2" when error diffusion is not performed.

At the user set value of 3, the adjusting coefficients N and M are "6" when error diffusion is performed, and the coefficients are "3" when error diffusion is not performed.

While the adjusting coefficients N and M are obtained using Expressions 5 and 6 above, the coefficients may be more precisely set using a correspondence table.

Figure 6:
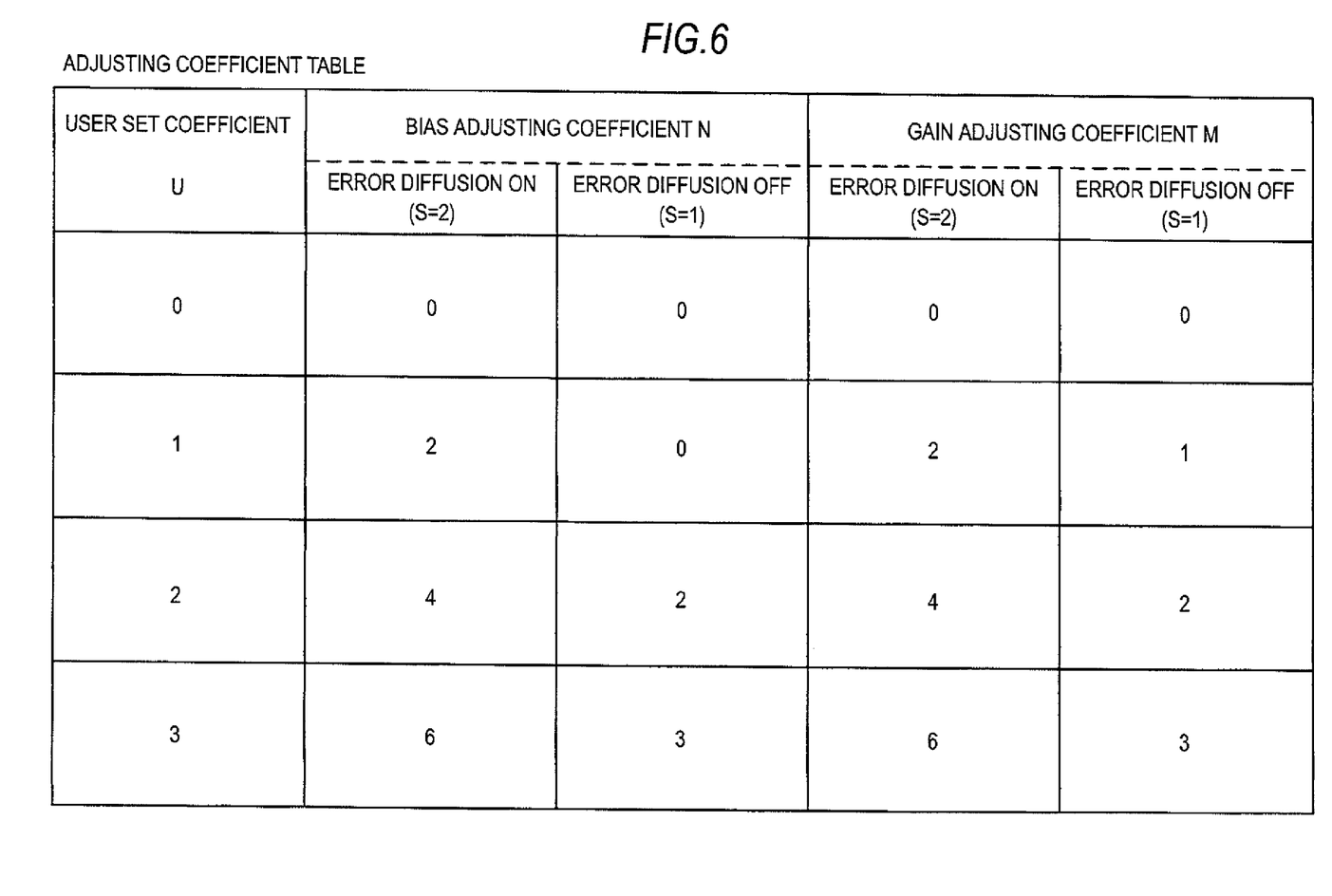
FIG. 6 is an adjusting coefficient table according to the embodiment of the present disclosure.

For example, an adjustment coefficient table may be provided as shown in FIG. 6. In each of the cases wherein error diffusion is performed and not performed in each user setting, the values of the adjusting coefficients N and M can be set with increased flexibility and diversity depending on the type of the apparatus used and conditions for designing. In the example shown in FIG. 6, at the user set value of 1, the adjusting coefficient N is "2" when error diffusion is performed, and the coefficient is "0" when error diffusion is not performed. At the same user set value, the adjusting coefficient M is "2" when error diffusion is performed, and the coefficient is "1" when error diffusion is not performed.

When the adjusting coefficients N and M are calculated as described above, the correction amount adjusting section 16 performs the following calculations to adjust a correction gain and a bias value determined by the correction gain/bias determining portion 14. Thus, an adjusted gain and an adjusted bias value are obtained.

$$\text{Adjusted gain} = \text{corrected gain} - 1)M/6 + 1 \quad \text{Expression 7}$$

$$\text{adjusted bias} = (\text{black peak} - \text{moderated black peak})N/6 + \text{moderated black peak} \quad \text{Expression 8}$$

The adjusted gain and the adjusted bias value are supplied to the contrast correction calculating section 3 as contrast correction values.

In this example, the contrast correction calculating section 3 does not perform the calculations of Expressions 2, 3, and 4 described above but performs the calculations of Expressions 9, 10, and 11 shown below.

$$Y_{out} = (Y_{in} - \text{black peak}) \times \text{adjusted gain} + \text{adjusted bias value} \quad \text{Expression 9}$$

$$Cr\_out = (Cr\_in - 128) \times \text{adjusted gain} + 128 \quad \text{Expression 10}$$

$$Cb\_out = (Cb\_in - 128) \times \text{adjusted gain} + 128 \quad \text{Expression 11}$$

When the adjusting coefficients N and M are set as shown in FIG. 5, contrast correction is carried out as follows.

When the user set value is 0, the adjusting coefficients N and M are 0 regardless of whether error diffusion is performed or not. Thus, an adjusted gain of 1 is obtained, and an adjusted bias is obtained at a value equal to the value of the moderated black peak. In this case, the luminance data Y of interest is biased only by the amount of the moderated black peak, and no contrast correction is applied to the data.

When the user set value is 1, both of the adjusting coefficients N and M are calculated at 2 as shown below if error diffusion is performed.

$$\text{adjusted gain} = (\text{corrected gain} - 1)/3 + 1$$

$$\text{adjusted bias} = (\text{black peak} - \text{moderated black peak})/3 + \text{moderated black peak}$$

In this case, contrast correction is performed at a low degree according to Expressions 9, 10, and 11 shown above.

Even when the user set value is similarly set at 1, both of the adjusting coefficients N and M are calculated at 1 as shown below if error diffusion is not performed.

$$\text{adjusted gain} = (\text{corrected gain} - 1)/6 + 1$$

$$\text{adjusted bias} = (\text{black peak} - \text{moderated black peak})/6 + \text{moderated black peak}$$

Then, contrast correction according to Expressions 9, 10, and 11 shown above is performed at a degree lower than the degree of correction carried out when error diffusion is performed.

When the user set value is 2, both of the adjusting coefficients N and M are calculated at 4 as shown below if error diffusion is performed.

$$\text{adjusted gain} = (\text{corrected gain} - 1)\tfrac{2}{3} + 1$$

$$\text{adjusted bias} = (\text{black peak} - \text{moderated black peak})\tfrac{2}{3} + \text{moderated black peak}$$

In this case, contrast correction is performed at an intermediate degree.

Even when the user set value is similarly set at 2, both of the adjusting coefficients N and M are calculated at 2 as shown below if error diffusion is not performed.

$$\text{adjusted gain} = (\text{corrected gain} - 1)/3 + 1$$

$$\text{adjusted bias} = (\text{black peak} - \text{moderated black peak})/3 + \text{moderated black peak}$$

Then, contrast correction is performed at a degree lower than the degree of correction carried out when error diffusion is performed.

When the user set value is 3, both of the adjusting coefficients N and M are calculated at 6 as shown below if error diffusion is performed.

$$\text{adjusted gain} = (\text{corrected gain} - 1) + 1 = \text{corrected gain}$$

$$\text{adjusted bias} = (\text{black peak} - \text{moderated black peak}) + \text{moderated black peak}$$

In this case, contrast correction is performed at the highest degree achievable with the correction gain determined by the correction gain/bias determining portion 14.

Even when the user set value is similarly set at 3, both of the adjusting coefficients N and M are calculated at 3 as shown below if error diffusion is not performed.

adjusted gain=(corrected gain−1)/2+1 adjusted bias=(black peak−moderated black peak)/2+ moderated black peak

Then, contrast correction is performed at a degree lower than the degree of correction carried out when error diffusion is performed.

As described above, the correction amount adjusting section 16 of the present embodiment adjusts the degree of contrast correction depending on whether error diffusion is performed or not and depending on the choice of a user. Specifically, when error diffusion is not performed, the amount of contrast correction obtained by the contrast correction calculating section 3 is kept smaller than the amount of correction made when error diffusion is performed. Further, the amount of contrast correction is adjusted according to a setting made by a user.

Thus, banding attributable to contrast correction can be suppressed even when error diffusion is stopped.

Further, contrast correction can be carried out according to the preference of a user.

Contrast correction frequently results in images giving a strong impression because dark regions increase in the images of interest. However, some people prefer images which give a light and soft impression. Under the circumstance, the amount of a correction effect can be adjusted by selecting any of values 0, 1, 2, and 3 to allow differences in preference between individual users to be canceled.

<4. Stabilization of Contrast>

In the present embodiment, the values of detected black and white peaks are smoothed by the smoothing section 11 at a time constant of 60 fields or more.

For example, smoothing has been performed in short cycles, e.g., in every field according to the related art as described in the above-cited Patent Document 1. However, in the case of video content including an image of a blinking lamp of an automobile rendered at a maximum value, a contrast correction value applied to the image can fluctuate too frequently if a short time constant is used, and the brightness of the screen as a whole can fluctuate depending on the blinking lamp.

The same phenomenon can occur in video content including subtitles appearing and disappearing one after another.

In the preset embodiment, the problem is solved by adopting a smoothing time constant as long as 60 fields or more. That is, a contrast correction value is prevented from fluctuating too frequently such that contrast correction will not follow up video content uselessly.

Thus, contrast is stabilized.

The contrast improving effect may become excessive or insufficient when it is applied to video content immediately after a scene of the content changes to another scene having a different pattern. In such a situation, the scene change detecting section 13 detects a scene change, and the time constant of the smoothing section 11 is shortened only in a period immediately after the scene change. That is, when a scene change takes place, the follow-up property is temporarily improved to adapt contrast correction to the new video content immediately. For example, the time constant may be shorted to a period equivalent to one field during a period worth 30 fields immediately after the detection of a scene change.

<5. Cancellation of Differences between Display Systems>

Display apparatus such as televisions and monitors for displaying images create gray levels (tone curves) in different ways which depend on the manufactures or types of the apparatus.

When gray levels near black are made nearer to black, regions in white seem relatively striking, and stronger contrast will be felt by a user. On the contrary, some display apparatus are designed with priority put on the prevention of clipping of gray levels near black.

The mode of display of an image is changed in various ways by switching the image quality mode of the display apparatus of interest.

In the present embodiment, contrast correction works to cancel differences between items of content such that a content item having floating blacks (blacks with light leak) is corrected to enhance the shades of black. As a result, shades of black can appear at an undesirably high probability on some display apparatus as a result of contrast correction. On the contrary, it may be desirable on some display apparatus that contrast correction is performed to achieve a higher effect of enhancing shades of black.

Under the circumstance, the present embodiment includes the black adjusting section 5 which is a circuit for allowing a tone curve (in particular, a tone curve of a black region) to be adjusted by operations of a user depending on the display apparatus used.

Figure 7A:
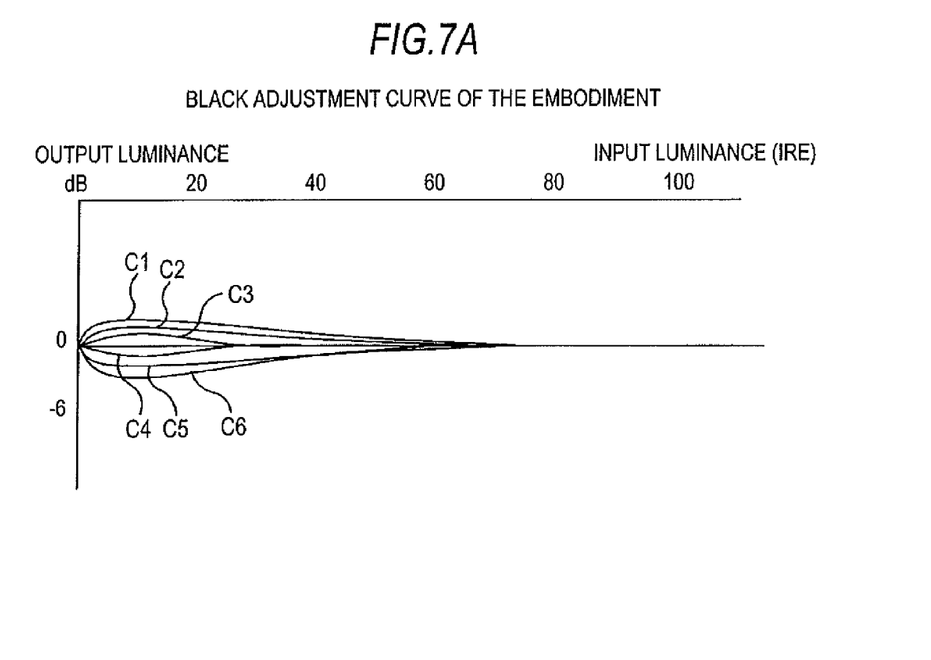
FIGS. 7A and 7B are black adjustment curves according to the embodiment of the present disclosure.

FIG. 7A shows black adjustment curves C1 to C6 which can be selected by the black adjusting section 5. A user may select any of the black adjustment curves C1 to C6 depending on the display apparatus used or according to the preference of the user. Thus, a black region of a video signal having corrected contrast is corrected according to the selected characteristics.

Thus, an image can be provided with appropriate contrast depending on the display apparatus used or according to the preference of the user.

When contrast correction of the present embodiment and the correction of a black region using a black adjustment curve are used in combination to correct colors toward black, a region located near black will appear in a deep color. The luminance of such a region having a deep color may not be reduced only by reducing the luminance signal. Under the circumstance, a more natural image can be obtained by using a circuit for reducing the deepness of the color of the region near black in combination with the above-described correction techniques.

Figure 7B:
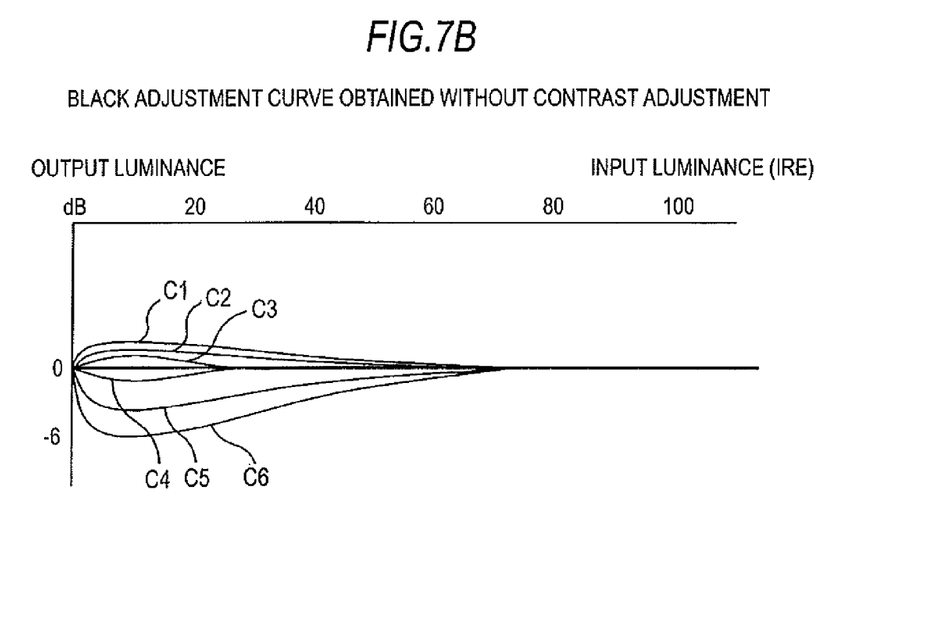

FIG. 7B shows exemplary black adjustment curves used in an apparatus which does not perform such a contrast correction as carried out in the present embodiment.

The amount of a correction made to a black region can be small when contrast correction is carried out according to the embodiment. As will be apparent from a comparison between FIGS. 7A and 7B, the black adjustment curves of FIG. 7A used by the video data processing apparatus 1 of the present embodiment are different in characteristics from the curves in FIG. 7B. Specifically, the curves in FIG. 7A are characterized in that the amounts of adjustment are suppressed.

A user setting may be made such that the video data processing apparatus 1 of the present embodiment can be optionally disabled from contrast correction at the contrast correction calculating section 3. The black adjusting section 5 may be provided with the characteristics shown in both of FIGS. 7A and 7B and represented by the black adjusting curves C1 to C6. The characteristics shown in FIG. 7A may be used when contrast correction is performed, and the characteristics shown in FIG. 7B may be used when contrast correction is disabled.

<6. Gray Level Compensation to Cope with Over-Compensation>

In the present embodiment, gray levels remain even when contrast correction performed by the contrast correction calculating section 3 results in over-compensation.

As described above, the black peak detecting portion 8 and the white peak detecting portion 9 detect peaks in a detection area set by the detection area setting portion 12, e.g., the central region A shown in FIG. 8B. When peaks are detected in the middle of a screen as thus described, contrast correction can be appropriately performed based on the luminance of a point of interest of a user.

However, pixel values resulting in strong contrast may reside in a peripheral region B as shown in FIG. 8B. In such a case, after video data of such a region is subjected to contrast correction, the region may be over-compensated. For example, when luminance data having a value higher than a white peak of the central region A resides in the peripheral region B, the value of the high luminance data may exceed an effective maximum luminance value (235 in 8-bit representation) if contrast correction is performed on the data using a contrast correction value determined based on the white peak detected in the central region A.

When luminance data having a value lower than a black peak of the central region A resides in the peripheral region B, the value of the low luminance data may fall below an effective minimum luminance value (16 in 8-bit representation) as a result of contrast correction similarly performed.

Normally, limitation is placed on data obtained by contrast correction to limit the value of the data to an effective maximum luminance value or an effective minimum luminance value when the value will otherwise exceed the effective maximum luminance value or the effective minimum luminance value. This, however, causes clipping of gray levels.

Figure 8A:
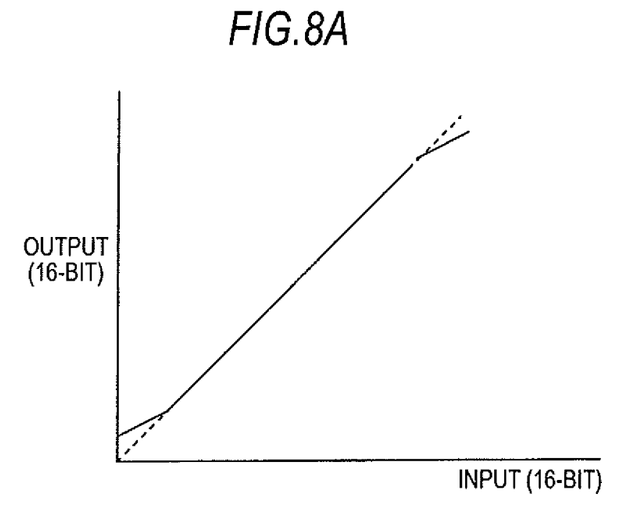
FIGS. 8A and 8B are graphs for explaining gray level compensation.
Figure 8B:
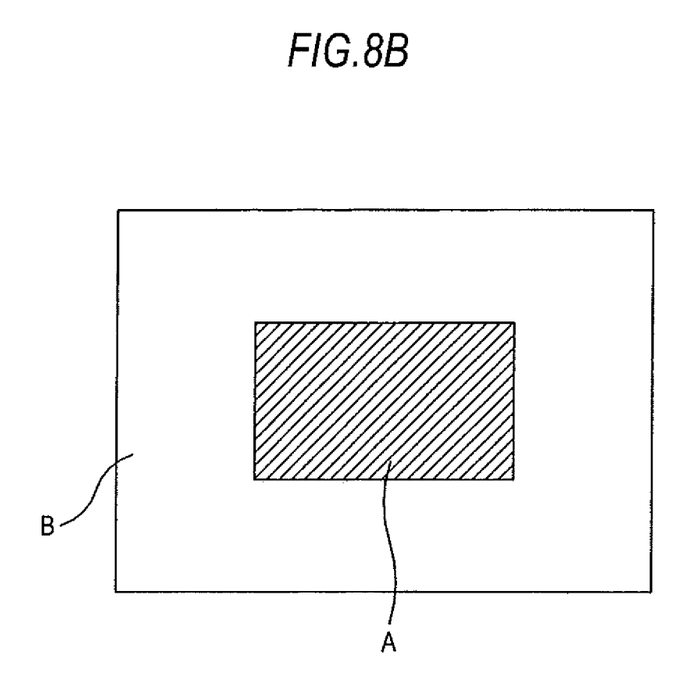

In such a situation, in the present embodiment, the gray level compensating section 4 performs data conversion according to the input-output characteristics with gradual slope as shown in FIG. 8A. Thus clipping of gray levels can be prevented.

The present disclosure is not limited to the above-described embodiment, and various modifications may be made to the embodiment.

Referring to setting according to the correction moderation table 15 (setting of a moderated peak curve), a range of gray levels for which contrast correction is to be suppressed can be arbitrarily set, and there are various possible settings.

The calculation performed at the correction amount adjusting section 16 to adjust a correction amount is not limited to the above-described example. The number of alternatives for user setting of a correction amount is not limited to four, and what is required is that there are at least two alternatives.

The correction amount adjusting section 16 performs adjustment in the direction of suppressing the amount of contrast correction depending on whether error diffusion is carried out or not and according to a setting made by a user. In the above-described embodiment, correction is carried out as determined by the correction value setting section 20 when error diffusion is performed and the maximum value "3" is set by a user. Alternatively, adjustment may be carried out to increase the amount of correction. For example, adjustment may be carried out to increase a correction gain determined by the correction value setting section 20 when error diffusion is performed and the user has set the maximum value.

The present disclosure contains subject matter related to that disclosed in Japanese Priority Patent Application JP 2010-182764 filed in the Japan Patent Office on Aug. 18, 2010, the entire content of which is hereby incorporated by reference.

What is claimed is:

1. A video data processing apparatus comprising:
a contrast correction calculating section correcting the contrast of input luminance data by performing a calculation using a contrast correction value;
an error diffusion section performing an error diffusion process on the luminance data whose contrast has been corrected;
an error diffusion setting section setting whether to perform the error diffusion process at the error diffusion section or not;
a correction value setting section detecting a black peak value and a white peak value of an input luminance signal and setting the contrast correction value using the detected black peak value and white peak value; and
a correction amount adjusting section adjusting the contrast correction value set by the correction value setting section depending on (i) whether the error diffusion process is performed at the error diffusion section or not according to an instruction from the error diffusion setting section and (ii) according to a contrast correction amount selected by a user from among a plurality of amounts including an amount indicating no contrast correction is to be performed, such that contrast correction obtained by the contrast correction calculating section when the error diffusion process is not performed is less than that obtained when the error diffusion process is performed in all situations in which the amount selected by the user is any amount except the no amount, and supplying the adjusted contrast correction value to the contrast correction calculating section.

2. A video data processing apparatus comprising:
a contrast correction calculating section correcting the contrast of input luminance data by performing a calculation using a contrast correction value;
an error diffusion section performing an error diffusion process on the luminance data whose contrast has been corrected;
an error diffusion setting section setting whether to perform the error diffusion process at the error diffusion section or not;
a correction value setting section detecting a black peak value and a white peak value of an input luminance signal and setting the contrast correction value using the detected black peak value and white peak value; and
a correction amount adjusting section adjusting the contrast correction value set by the correction value setting section depending on whether the error diffusion process is performed at the error diffusion section or not according to an instruction from the error diffusion setting section and supplying the adjusted contrast correction value to the contrast correction calculating section,
wherein when the error diffusion process at the error diffusion section is not performed according to a setting made by the error diffusion setting section, the correction amount adjusting section adjusts the contrast correction value so as to suppress the contrast correction amount obtained by the contrast correction calculating section below the amount of a correction made when the error diffusion process is performed.

3. A video data processing apparatus according to claim 2, further comprising a user setting section for setting a contrast correction amount according to selection made by a user, wherein the correction amount adjusting section adjusts the contrast correction value depending on whether the error diffusion process at the error diffusion section is performed or not and, in addition, according to the contrast correction amount set at the user setting section.

4. A video data processing apparatus according to claim 3, wherein the correction value setting section sets the contrast correction value using a difference between a detected black peak value and a detected white peak value and a difference between a moderated black peak value and a moderated white peak value associated with the detected black peak value and white peak value, among moderated black peak values and moderated white peak values which are set in association with respective gray level values.

5. A video data processing apparatus according to claim 4, wherein the correction value setting section smoothes the detected black peak value and the detected white peak value at a smoothing time constant which is a period of 60 fields or more and sets the contrast correction value using the smoothed black peak value and white peak value.

6. A video data processing apparatus according to claim 5, further comprising a scene change detecting section detecting a scene change in video data, wherein the correction value setting section temporarily changes the smoothing time constant into a shorter time constant when a scene change is detected by the scene change detecting section.

7. A video data processing apparatus according to claim 6, wherein the correction value setting section detects a black peak value and a white peak value of a luminance signal from a peak detection area which is a pixel region forming a part of a video screen, and the apparatus further comprising a gray level compensating section converting input and output values of the luminance data corrected by the contrast correcting section such that gray levels will be maintained.

8. A contrast correcting method of a video data processing apparatus including a contrast correction calculating section correcting the contrast of input luminance data by performing a calculation using a contrast correction value, an error diffusion section performing an error diffusion process on the luminance data whose contrast has been corrected, and a correction value setting section detecting a black peak value and a white peak value of an input luminance signal and setting the contrast correction value using the detected black peak value and white peak value, the method comprising:

allowing a setting to be made as to whether to perform the error diffusion process at the error diffusion section or not; and adjusting the contrast correction value set by the correction value setting section depending on whether the error diffusion process is performed at the error diffusion section or not and performing contrast correction at the contrast correction calculating section using the adjusted contrast correction value, wherein when the error diffusion process at the error diffusion section is not performed according to a setting made, the contrast correction value is adjusted so as to suppress the contrast correction amount obtained by the contrast correction calculating section below the amount of a correction made when the error diffusion process is performed.

* * * * *